(12) United States Patent
Pan et al.

(10) Patent No.: US 6,480,976 B1
(45) Date of Patent: Nov. 12, 2002

(54) SYSTEM AND METHOD FOR RESOURCE OPTIMIZED INTEGRATED FORWARD ERROR CORRECTION IN A DMT COMMUNICATION SYSTEM

(75) Inventors: Wenwei Pan, Ocean, NJ (US); Jian Wang, Morganville, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 0 days.

(21) Appl. No.: 09/523,747

(22) Filed: Mar. 13, 2000

Related U.S. Application Data (60) Provisional application No. 60/123,875, filed on Mar. 11, 1999.

(51) Int. Cl.[7] .................................................. G06F 11/00
(52) U.S. Cl. ........................................ 714/701; 714/784
(58) Field of Search ................................ 714/752, 751, 714/784, 701

(56) References Cited

U.S. PATENT DOCUMENTS 5,737,337 A * 4/1998 Voith et al. ................ 714/702
6,353,900 B1 * 3/2002 Sindhushayana et al. ... 714/701

* cited by examiner

*Primary Examiner*—Phung M. Chung
(74) *Attorney, Agent, or Firm*—Thomas, Kayden, Horstemeyer & Risley

(57) ABSTRACT

A resource optimized interleaving/deinterleaving system comprising a Reed-Solomon encoder, a Reed-Solomon decoder, a state machine, and a memory is disclosed. Reed-Solomon encoded fastpath data is stored in memory. A stream of interleaved data with predefined parameters S, the number of DMT symbols per each Reed-Solomon codeword, D, the interleaving depth, and N, the block length is written into system memory at an adaptable rate determined by the Reed-Solomon encoder. The previously stored Reed-Solomon encoded fastpath data is automatically reassembled and buffered with the interleaved data to form appropriate DMT transmission symbols. The DMT transmission symbols are then read out of the system memory at a rate determined by the next processing function, i.e., tone ordering. A method of using one Reed-Solomon encoder/decoder with the integrated interleaving/deinterleaving system to support dual single latency DMT systems is also disclosed.

30 Claims, 11 Drawing Sheets

FIG. 1

(PRIOR ART)

SYSTEM AND METHOD FOR RESOURCE OPTIMIZED INTEGRATED FORWARD ERROR CORRECTION IN A DMT COMMUNICATION SYSTEM

CROSS-REFERENCE TO RELATED APPLICATION

The present application claims the benefit of U.S. provisional patent application, serial No. 60/123,875, filed Mar. 11, 1999, entitled, "DMT System Resource Optimization by Integrating Interleaving/Deinterleaving Memory with Rate Adaptation Buffer," which is hereby incorporated by reference in its entirety. This application is further related to co-pending U.S. utility patent application entitled, "Circuit and Method for Convolutional Interleaving Using a Single Modulo Operation." And accorded Ser. No. 09/524,464, filed on Mar. 13, 2000, which is entirely incorporated herein by reference.

BACKGROUND OF THE INVENTION

1. Field of the Invention

The present invention generally relates to high speed data communications wherein signal information is processed both in digital and analog forms. More specifically, the invention is related to both a system and method that provides resource optimization and data processing rate adaptability in forward error correction encoding within digital subscriber line modems.

2. Discussion of the Related Art

In recent years, telephone communication systems have expanded from traditional plain old telephone system (POTS) communications to include high-speed data communications as well. As is known, POTS communications include the transmission of voice information, control signals, public switched telephone network (PSTN) information, as well as, information from ancillary equipment in analog form (i.e. computer modems and facsimile machines) that is transmitted in the POTS bandwidth.

Prompted largely by the desire of large businesses to reliably transfer information over a broadband network, telecommunications service providers have employed digital subscriber lines (DSL) to provide a plethora of interactive multi-media digital signals over the same existing POTS twisted-pair lines.

The provision of DSL services to customer premises has proliferated over recent years. DSL services are typically provided to remotely located customer premises by equipping both the appropriate central office and the customer premises with compatible DSL modems. DSL modems communicate by modulating a baseband signal with customer desired service signals, converting the modulated digital data signal to an analog signal, and transmitting the analog signal over the conventional copper wire pair provided in the PSTN from a central office to a customer premises via a carrier service area (CSA) loop. Well known data modulation and transmission techniques include mapping digital data to be transmitted into a multi-dimensional multi-level signal space constellation and decoding the received constellation to recover the transmitted information.

DSL modems use a number of different modulation schemes and rates. Asymmetric digital subscriber line (ADSL) systems adopted discrete multi-tone (DMT), a rate adaptive and tone flexible multi-carrier data transmission method. DMT systems, by nature of their distribution across multiple frequency bands, are capable of retuning modems to optimize data transfer for changing line conditions. DMT devices selectively transfer bits from the data stream in those discrete frequency bands that are uncorrupted from amplitude modulation radio interference and unaffected by phone system bridge taps, thereby tuning, or maximizing performance under changing line conditions.

To accommodate maximum flexibility for providers and end users of ADSL services, forward error correction (FEC) is selectively applied to the composite data streams to, or from, the central office ADSL modem. This permits FEC to be included or excluded on a data service by data service basis within the composite data stream.

As an example of the mixed requirements for FEC in an ADSL service, consider transmitting a one-way data stream from the central office to a remote unit along with a bi-directional channel. The end user may require high reliability on the one-way channel because the channel may contain highly compressed digital data with no possibility for requesting retransmission. For this portion of the composite data stream, FEC is necessary. On the other hand, voice services and duplex data services with their own embedded protocols may require minimum latency. For this portion of the composite data stream, FEC is optional.

FEC involves the addition of redundant information to the data to be transferred. The data to be transferred along with the redundant data when added together form what are commonly known as codewords. FEC in ADSL employs Reed-Solomon codes based on symbols of 8 bits to a byte. That is, a code over the Galois Field ($2^8$). FEC in ADSL is rate adaptable providing for various interleave depths and codeword lengths to support a range of data rates while maintaining constant interleave latency. An enhancement to FEC involves shuffling or interleaving the encoded data prior to transmission, then unshuffling or deinterleaving the data received at the remote DSL modem. Interleaving ensures that bursts of error noise during data transmission do not adversely affect any individual codeword in the transmission. If noise affects a particular frame of data, only a minimum number of bytes of any particular codeword will be affected as the individual codewords are distributed across multiple frames.

The combination of Reed-Solomon encoding with data interleaving is highly effective at correcting errors caused by impulse noise in the service subscriber's local loop. In prior art convolutional interleavers, after writing a byte into interleave memory, a previously written byte is read from the same memory.

Convolutional interleaving/deinterleaving along with Reed-Solomon coding as part of Forward Error Correction (FEC) control is an effective method for dealing with burst error channels in modem telecommunication systems. In DMT systems, two latency channels are supported: interleave data and fast data (without interleaving).

The system performance trade-off introduced by FEC in the form of Reed-Solomon coding and convolutional interleaving can be described as increased data transmission reliability at the expense of increased channel latency. U.S. Pat. No. 5,737,337 to Voith et al. introduced a method for interleaving data in a DSL transmitter. The method taught in the '337 patent is a two-step process, as it teaches writing to memory, then interleaving the previously encoded data. Further, because memory reads are coupled to memory writes, the method taught in the '337 patent is not rate adaptive. As a result, data transmission is not only delayed for Reed-Solomon coding but data interleaving, as well, prior to constellation coding in ADSL modems.

SUMMARY OF THE INVENTION

In light of the foregoing, the invention is a system and method that provides one-step real time interleaving thus reducing the performance bottleneck introduced during interleaving. In addition, the system and method of the present invention reduces system resources while optimizing system performance and providing processing rate adaptability. The system and method of the present invention also enable pipelining of data during FEC decoding.

To achieve the objects and advantages of the present invention, the present invention is directed to a method for integrating both fastpath and interleaved data in a memory device at the rate provided by a Reed-Solomon encoder. The integrated fastpath and interleaved data is then read from the memory device at the rate requested by the next data processing device, i.e. tone ordering and symbol generation. The method of the present invention is applicable in the received data path as well. Received data symbols are first decoded in a constellation decoder before being sent to deinterleave memory. As in the transmit data path, data from constellation decoding is applied to deinterleave memory at the rate provided by the constellation decoder. The integrated fastpath and interleaved data is read and forwarded to a Reed-Solomon decoder in one-step at the rate the data is requested by the Reed-Solomon decoder.

A system consistent with the aforementioned method may be implemented in a data transmission path with a Reed-Solomon encoder, a state machine, and a memory device. In a received data path, the system may comprise, a Reed-Solomon decoder, a state machine, and a memory device. It is significant to note that the Reed-Solomon decoder may be segmented to enable pipelining of the received encoded data. Other objects, features, and advantages of the present invention will become apparent to one skilled in the art upon examination of the following drawings and detailed description. It is intended that all such additional objects, features, and advantages be included herein within the scope of the present invention, as defined by the claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENTS

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims. Turning now to the drawings, wherein like referenced numerals designate corresponding parts throughout the drawings, reference is made to FIG. 1, which illustrates the delivery of broadband communication services via an ADSL communications system over the POTS network. In this regard, a central office 10 is configured to receive broadband services which it assembles via central office ADSL card 45 for transmission over a POTS twisted-pair phone line to a customer premises 50. Examples of such broadband services are depicted as video conferencing 15, Internet 20, telephone services 25, movies on demand 30, and broadcast media 35. Central office 10 assembles signals from the aforementioned broadband services via multiplexer (mux) 40 for appropriate transformiation and transmission by ADSL cards 45.

Figure 1:
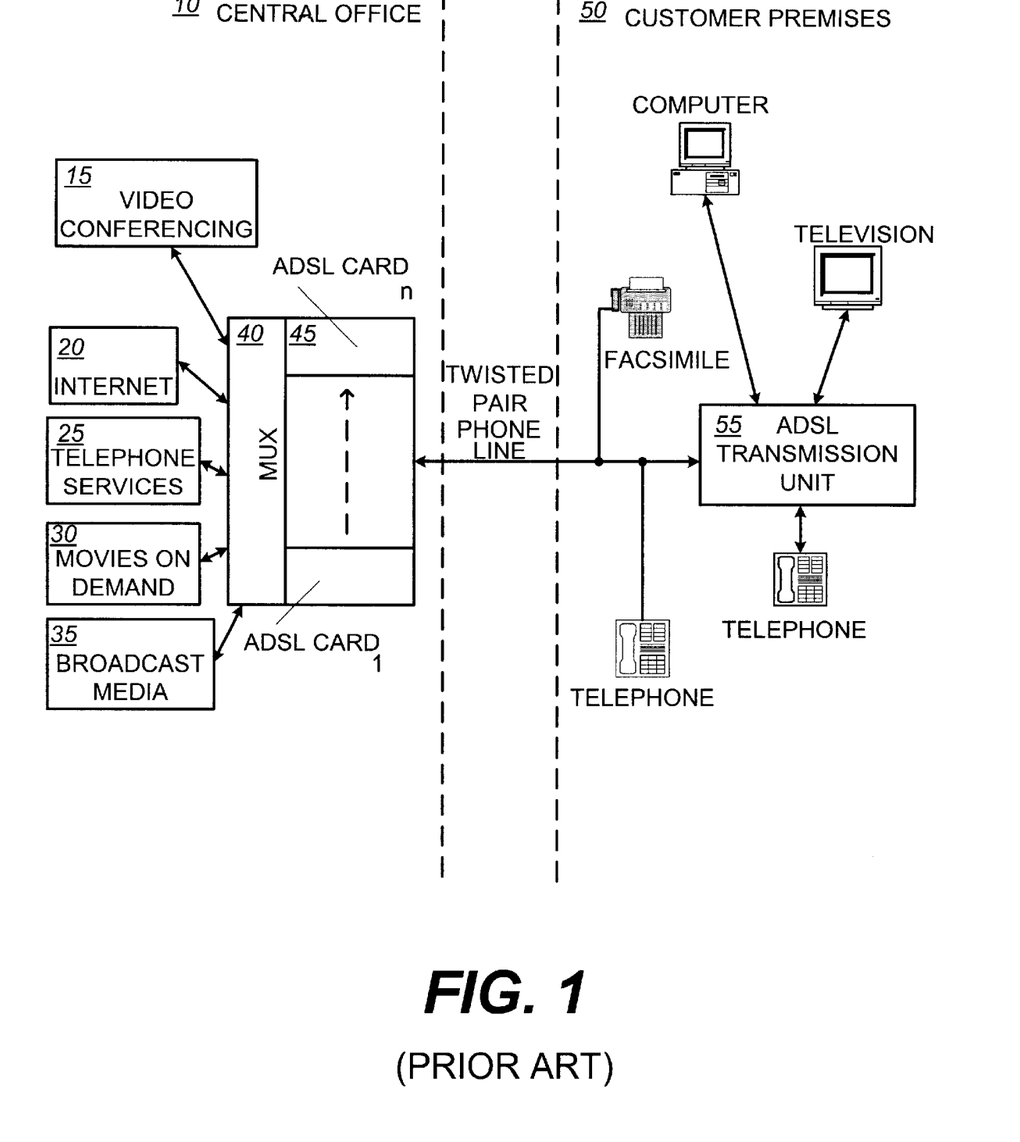
FIG. 1 is a block diagram illustrating the delivery of multiple broadband services via an ADSL communications system.

Customer premises 50 has a compatible ADSL transmission unit 55, which processes and distributes the several services to appropriate destination devices such as a computer, television, a facsimile machine, and a telephone as illustrated. It is significant to note that customer premises 50 may have POTS devices such as a facsimile machine and another telephone integrated on the PSTN line along with ADSL transmission unit 55. It should be understood that the circuitry conventionally implemented in, for example, an ADSL transceiver will be included within ADSL cards 45 and ADSL transmission unit 55 as shown in FIG. 1. The implementation of such circuitry will be appreciated by persons skilled in the art, and need not be described herein.

Figure 2:
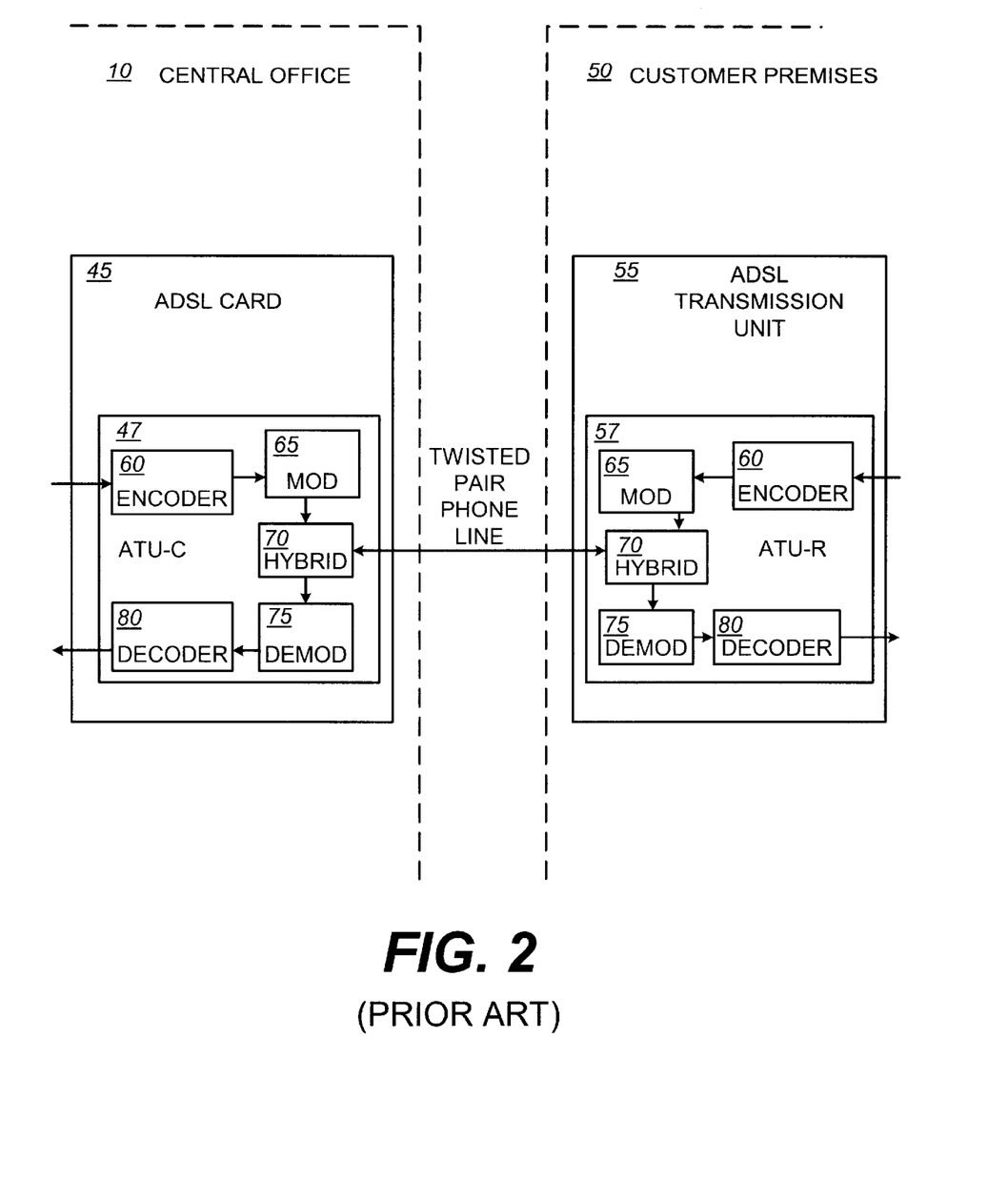
FIG. 2 is a block diagram further illustrating the functions performed within compatibly configured ADSL transmission units at a central office and a remote location consistent with the communications system of FIG. 1.

Having provided a top level description of a communications system configured to deliver a multitude of broadband services, reference is now made to FIG. 2, which illustrates a portion of a ADSL modem card 45 and an ADSL transmission unit 55 as shown in FIG. 1. In this regard, ADSL modem card 45 contains an ADSL modem unit— central office, hereinafter ATU-C 47. Similarly, ADSL transmission unit 55 contains an ADSL transmission unit— remote, hereinafter ATU-R 57. Both ATU-C 47 and ATU-R 57 serve to enable two-way communications between ADSL modem card 45 and ADSL transmission unit 55 via the PSTN. Since each ATU is similarly configured, the description herein will address the five functional blocks only once. Both ATU-C 47 and ATU-R 57 receive digital data in encoder 60. Encoder 60 processes the digital data and forwards it to modulator 65, which adaptively applies the digital data across the DMT frequencies. Modulator 65 then forwards a multitude of designated spread spectrum frequencies to hybrid 70 for data transmission along the PSTN line. In the manner described above, data is assembled, adaptively applied, and transmitted from one ADSL device to another across each of the separate DMT channels as the physical characteristics of the environment surrounding each individual system allows.

Similarly, hybrid 70 is configured to receive a multitude of spread spectrum frequencies from the remote ADSL transmission unit along the PSTN line. Hybrid 70 forwards designated spread spectrum frequencies to demodulator 75. Demodulator 75 processes the set of spread spectrum frequencies to recover digital data. Demodulator 75 forwards the digital data to decoder 80. Decoder 80 processes the digital data and distributes it to the appropriate broadband device.

Figure 3:
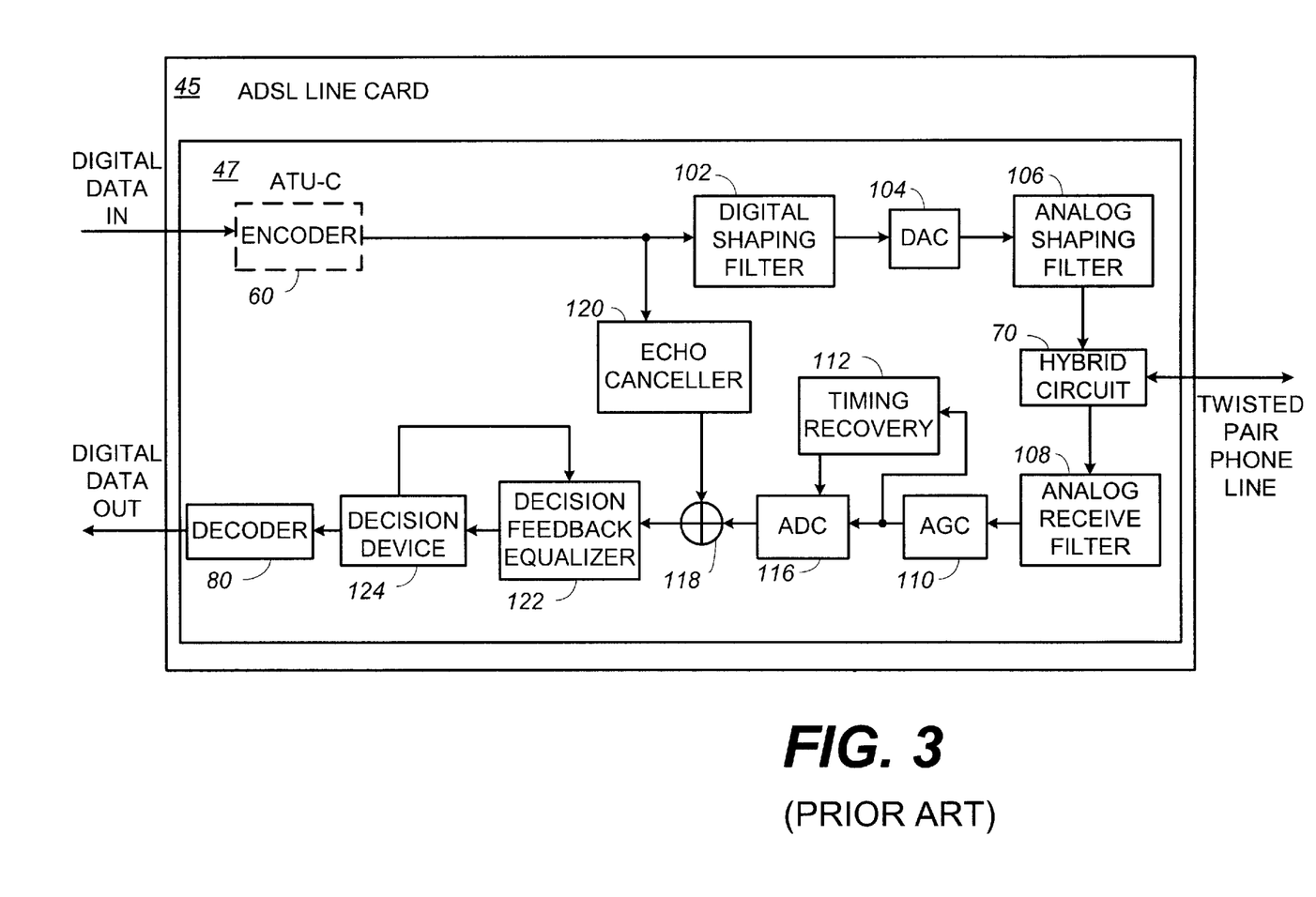
FIG. 3 is a block diagram that illustrates the functional elements of an ADSL transmission unit introduced in FIGS. 1 and 2.

Having provided a top level description of the functional blocks of an ADSL communications system configured to deliver a multitude of broadband services, with regard to FIG. 2, reference is now directed to FIG. 3, which illustrates a portion of an ADSL line card 45 and an ATU-C 47 as illustrated in FIG. 2. As shown in FIG. 3, an ATU-C 47 may be disposed within an ADSL line card 45 of FIG. 2 at either station in a two-station communication system. As further illustrated in FIG. 3, the ADSL line card 45 may be described as an ATU-C 47. As shown in FIG. 3, an ATU-C 47 may comprise an encoder 60, a digital shaping filter 102, a digital to analog converter (DAC) 104, an analog shaping filter 106, and a hybrid circuit 70 in the upstream data path. Conversely, the ATU-C 47 may comprise a hybrid circuit 70, an analog receive filter 108, an automatic gain control amplifier (AGC) 110, a timing recovery circuit 112, an analog to digital converter (ADC) 116, a summer 118, an echo canceller 120, a decision feedback equalizer 122, a decision device 124, and a decoder 80 in the downstream data path.

In this regard, the upstream data transmission portion of an ATU-C 47 may function as follows. The bits of the digital data input signal may be encoded into a complex data symbol in encoder 60. The complex data symbols may be forwarded to a digital shaping filter 102 and an echo canceller 120. Digital shaping filter 102 may take the form of a finite impulse response (FIR) filter selected and used to shape the frequency spectrum across a particular ADSL communication channel. The output of the digital shaping filter 102 may then be forwarded to DAC 104. Having converted the digitally filtered complex data symbols representing the digital input data stream in DAC 104 to an analog signal, the analog representation of the digital data input stream may be further processed by an analog shaping filter 106. In this regard, analog shaping filter 106 may take the form of a Butterworth lowpass filter to control out-of-band energy present in the analog signal. The filtered transmit signal may then be coupled to the twisted pair telephone line via hybrid circuit 70. Hybrid circuit 70 may comprise two unidirectional ports (one for data transmission and one for data reception) and one bi-directional port. The bi-directional port may be integrated with the twisted-pair telephone line. If the impedance of the twisted-pair matches the design impedance of the hybrid, there will be perfect isolation between the transmitting and receiving ports within hybrid circuit 70. For this ideal case, the hybrid circuit 70 return loss is infinity. In reality, the line impedance is a variable of frequency and varies significantly between individual CSA loops.

Having briefly described the upstream functional operation of ATU-C 47, reference will now be directed to downstream data transmission within ATU-C 47. In this regard, a Butterworth low-pass filter may also be used for the analog receive filter 108. The function of the analog receive filter 108, like its counterpart in the transmission path of ATU-C 47 is to reduce out-of-band noise. Having removed the low-frequency out-of-band noise in the analog receive filter 108, the filtered analog data stream may be forwarded to the AGC 110. AGC 110 may be necessary to bring the received signal magnitude to that close to the normal transmit signal level for subsequent digital conversion and processing. Having adjusted the magnitude of the received signal in AGC 110, the filtered and amplified receive signal may be processed through a timing recovery circuit 112. Timing recovery circuit 112 typically coordinates the sampling clocks used to process data in both DAC 104 in the upstream data path, as well as, ADC 116 in the receive data path. ADC 116 may be synchronized to the DAC 104 through the timing recovery circuit 112 such that upstream and downstream data symbols are synchronized within the ATU-C 47.

Once the received data has been converted to a digital data stream in ADC 116, digital signal processing of the complex data symbols encoded within the received signal path may be processed. After analog to digital conversion, the output of the echo canceller 120 from the upstream data path may be mathematically combined with the received signal. The combination may take place in summer 118.

Echo canceller 120 may be designed to resemble the equivalence of the echo path as defined by both the digital and analog shaping filters 102, 106, the DAC 104, the hybrid circuit 70, the analog receive filter 108, the AGC 110, the timing recovery circuit 112, and the ADC 116. In typical configurations, the echo path transfer function is identified with an adaptive signal processing algorithm.

The digitized and echo-canceled received signal may be further filtered by decision feedback equalizer 122 before being forwarded to a decision device 124. The decision feedback equalizer 122 may comprise a feed-forward filter and a feedback filter. The feed-forward filter equalizes the precursor of the CSA loop channel impulse response, while the feedback filter cancels the effect of the post-cursor of the channel impulse response. The decision feedback equalizer 122 is necessary for the ATU-C 47 to maintain minimal noise enhancement during the channel equalization process. Decision device 124 may take the form of a threshold detector configured to correspond to the discrete voltage levels used by the line code. After signal processing in the decision device 124, received symbols are converted back into signal bits in decoder 80 to create a digital data bit stream.

Forward Error Correction

Figure 4:
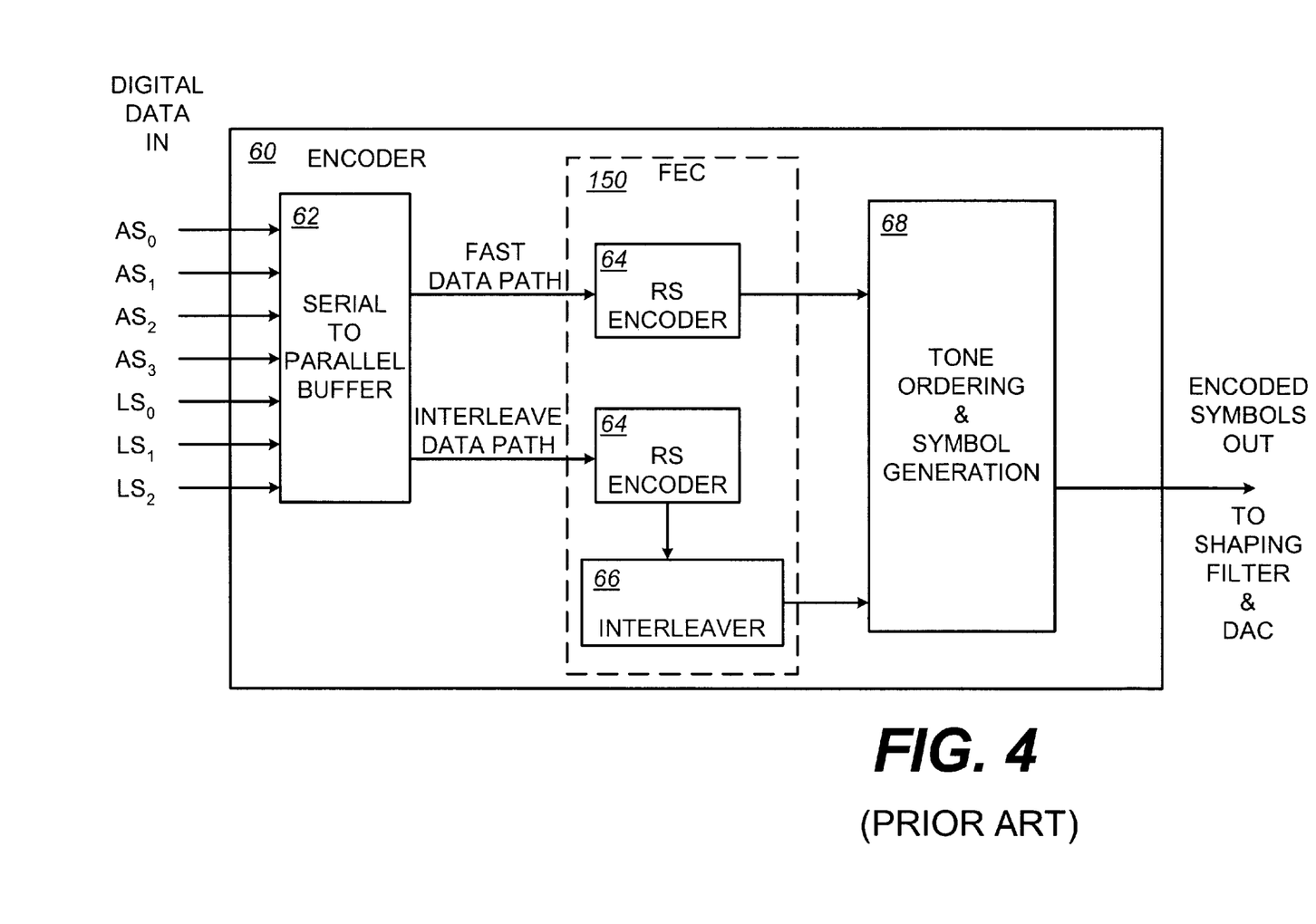
FIG. 4 is a functional block diagram illustrating a prior art FEC configuration.

Having described both the upstream and downstream processing paths through an ATU-C 47 with regard to FIG. 3, reference is now directed to FIG. 4. In this regard, FIG. 4 is a functional block diagram illustrating forward error correction (FEC) in the encoder 60 of FIGS. 2 and 3.

As illustrated in FIG. 4, an encoder 60 configured to perform FEC may comprise a serial to parallel buffer 62, a FEC 150, and a tone ordering and symbol generator 68. As further illustrated in FIG. 4, the FEC 150 may comprise one or more Reed-Solomon encoders 64 and an interleaver 66.

Digital data signals enter the encoder 60 on one or more possible input paths herein illustrated as AS0, AS1, AS2, AS3, LS0, LS1, LS2. AS stands for asymmetric signal and corresponds to downstream simplex data designated for transmission from the ATU-C 47 to the ATU-R 57. The data rates on each of the $AS_x$ channels are determined through rate negotiation. The LS channels are similar, except that they are bi-directional and typically operate at a lower transmission rate. Different $AS_x$ and LS, channels may correspond to different digital services. For example, LS, channels may be used for videophone, digital telephony, data transfer, and signaling. $AS_x$ channels are typically used for high-quality digital video, but are also appropriate for high-speed data transfer.

One of ADSL's features, rate negotiation, accommodates various applications within a single standard compliant modem. During initialization of the ADSL link, the ATU-C 47 transmits a set of data rates that it would prefer to use. The ATU-R 57 can implement these rates, or signal to the ATU-C 47 that it is unable to support the preferred rates. The number of bytes per symbol and selected coding options are exchanged during rate negotiation for each of the $AS_x$ and $LS_x$ channels.

Another feature of the separate data paths through the ATU-C 47 supports the fast/interleave data processing concept. As illustrated in FIG. 4, the $AS_x$ and $LS_x$ data channels may be processed by serial to parallel buffer 62 to create fastpath data and interleave data for FEC processing in Reed-Solomon encoders 64 located within FEC 150. Data signals requiring low-latency transfer through the ADSL communication link may be assigned (through the rate negotiation function) to a fast data path with minimal latency. Data signals that can tolerate a longer processing delay may be assigned to an interleave path that has much better immunity to noise impulses. Data bits in the interleave path are time interleaved over a relatively long period of time to disperse the effect of data transmission errors introduced by temporary impulsive disturbances on the twisted-pair telephone line.

As further illustrated in FIG. 4, both the fast and interleaved data paths are independently applied to Reed-Solomon encoders 64 as shown in FEC 150. Reed-Solomon encoders 64 independently generate N symbol codewords comprising K data symbols of S bits each with N–K parity symbols of S bits each added thereto. The total number of parity symbols is equal to 2T, where 2T=N–K. The N symbol codewords are a systematic code because the encoded data is left unchanged and the parity symbols are appended. Reed-Solomon codes provide a significant advantage in that they can correct up to T symbol errors in the N symbol codeword. Given a symbol size S (the bit width per symbol), the maximum codeword length N for a Reed-Solomon code is $N=2^S-1$. Generally, the amount of processing power required to encode and decode Reed-Solomon codes is related to the number of parity symbols per N symbol codeword. A large value for T translates into the ability to correct a large number of errors in the received N symbol codeword, but correspondingly requires more computational power than if T were of a smaller magnitude.

A Reed-Solomon N symbol codeword is generated using a generator polynomial, where all valid codewords are exactly divisible by the generator polynomial. The form of the generator polynomial is given by $g(x)=(x-\alpha^i)(x-\alpha^{i+1}) \ldots (x-\alpha^{i+2t-1})$, and the N symbol codeword is generated using $c(x)=g(x)i(x)$, where $g(x)$ is the generator polynomial, $i(x)$ is the information or data block, and $c(x)$ is a valid N symbol codeword, and $\alpha$ is referred to as a primitive element of the field. The 2T parity symbols in the N symbol codeword are given by $p(x)=i(x)x^{N-K} \mod g(x)$.

As further illustrated in FIG. 4, the Reed-Solomon encoded fastpath data and the Reed-Solomon encoded interleaved data may be then forwarded for further digital processing by tone ordering and symbol generator 68 prior to being further processed by the shaping filters 102 and 106 and DAC 104 prior to transmission via hybrid 70 (see FIG. 3).

Integrated Interleaving/Deinterleaving Memory for Forward Error Correction

Figure 5:
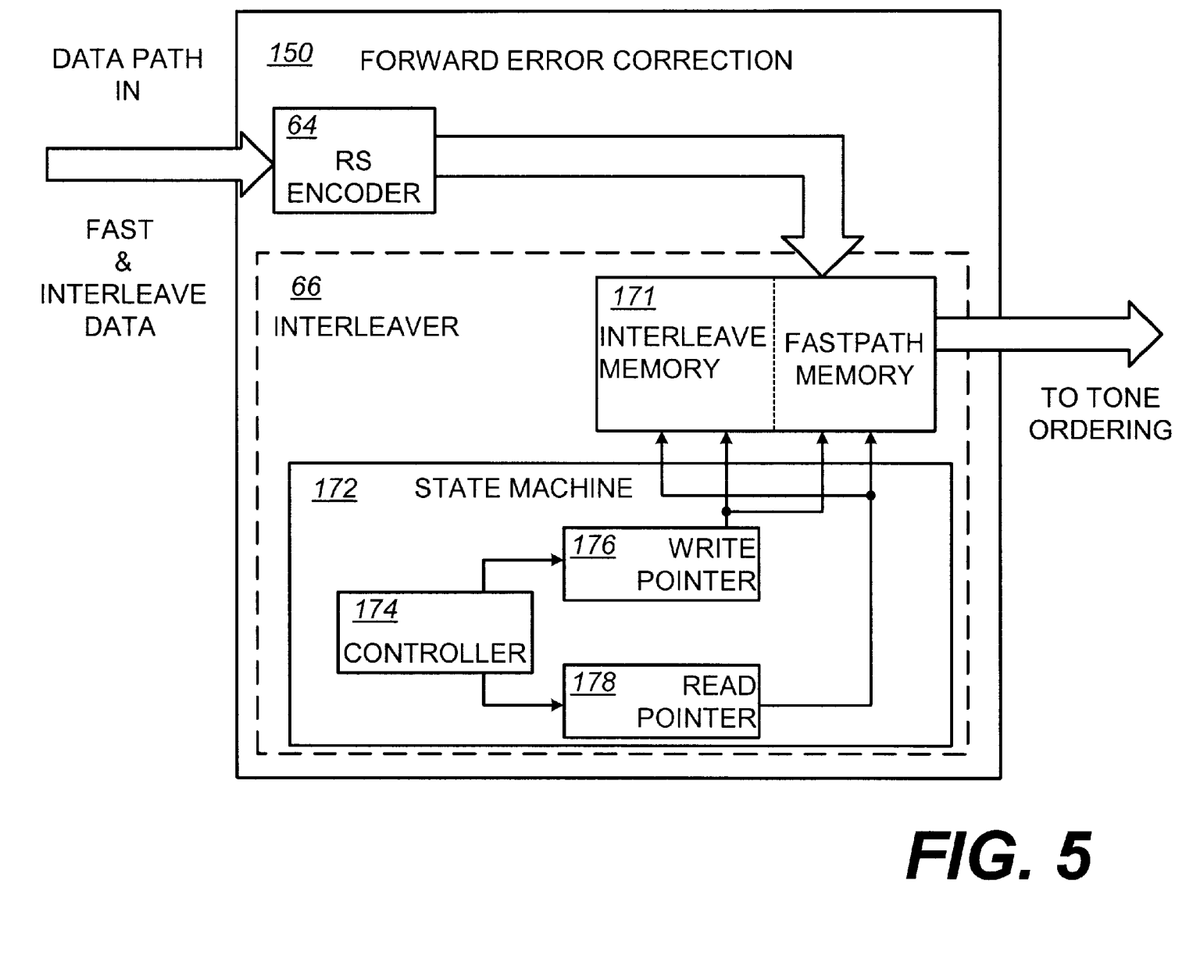
FIG. 5 is a block diagram illustrating the integrated interleaving memory in the transmit data path FEC of the present invention.

Having described a typical prior art encoder 60 with regard to FIG. 4, reference is now directed to FIG. 5, which illustrates an improved FEC consistent with the present invention. In this regard, the improved FEC 150 may comprise a single Reed-Solomon encoder 64 and interleaver 66. The interleaver 66 may further comprise an interleave memory 171 and a state machine 172. The interleave memory 171 may be divided into a portion for interleaved data storage and a portion for fastpath data storage as illustrated in FIG. 5. The interleave memory may be implemented via on chip RAM as well as with external RAM devices as are well known by those skilled in the art. The state machine 172 may further comprise a controller 174, a write pointer 176, and a read pointer 178.

In this regard, controller 174 coordinates the write pointer 176 to ensure that data being placed in interleave memory 171 by the Reed-Solomon encoder 64 is placed in a memory location where it can later be retrieved in the correct sequence for further digital processing. Similarly, controller 174 coordinates the write pointer 176 to ensure that fastpath data being stored in interleave memory 171 by the Reed-Solomon encoder 64 is placed in memory locations where they can later be retrieved in the proper sequence for further digital processing. It is readily apparent that if fastpath and interleave data are integrated or written to a single memory device using a forward operative process that the fastpath and interleave data may be reassembled or read in the correct order by a similar process configured to automatically recognize fastpath and interleave data locations within the memory device.

Both fastpath data and interleave data may be introduced at the input to a single Reed-Solomon encoder 64 for encoding. As each data byte is encoded, the encoded output data may be sent to interleave memory 171. State machine 172 may be configured to control the positioning of an interleave write pointer and an interleaving read pointer. By processing both the fast data path and interleave path data, the integrated interleaver 66 of the present invention provides input processing rate adaptability as data may be stored by interleave memory 171 once it has been encoded by Reed-Solomon encoder 64. Similarly, since both the fastpath and interleaved data are available in the same memory device (interleave memory 171) the interleaver 66 is rate adaptable to the next stage of digital signal processing indicated in FIG. 5 as tone ordering. Since the state machine 172 of the present invention is adaptable to varying processing rates for memory writes and memory reads, the subsequent data processor, herein illustrated as tone ordering, may control the rate that data is read from the interleave memory 171.

Figure 6:
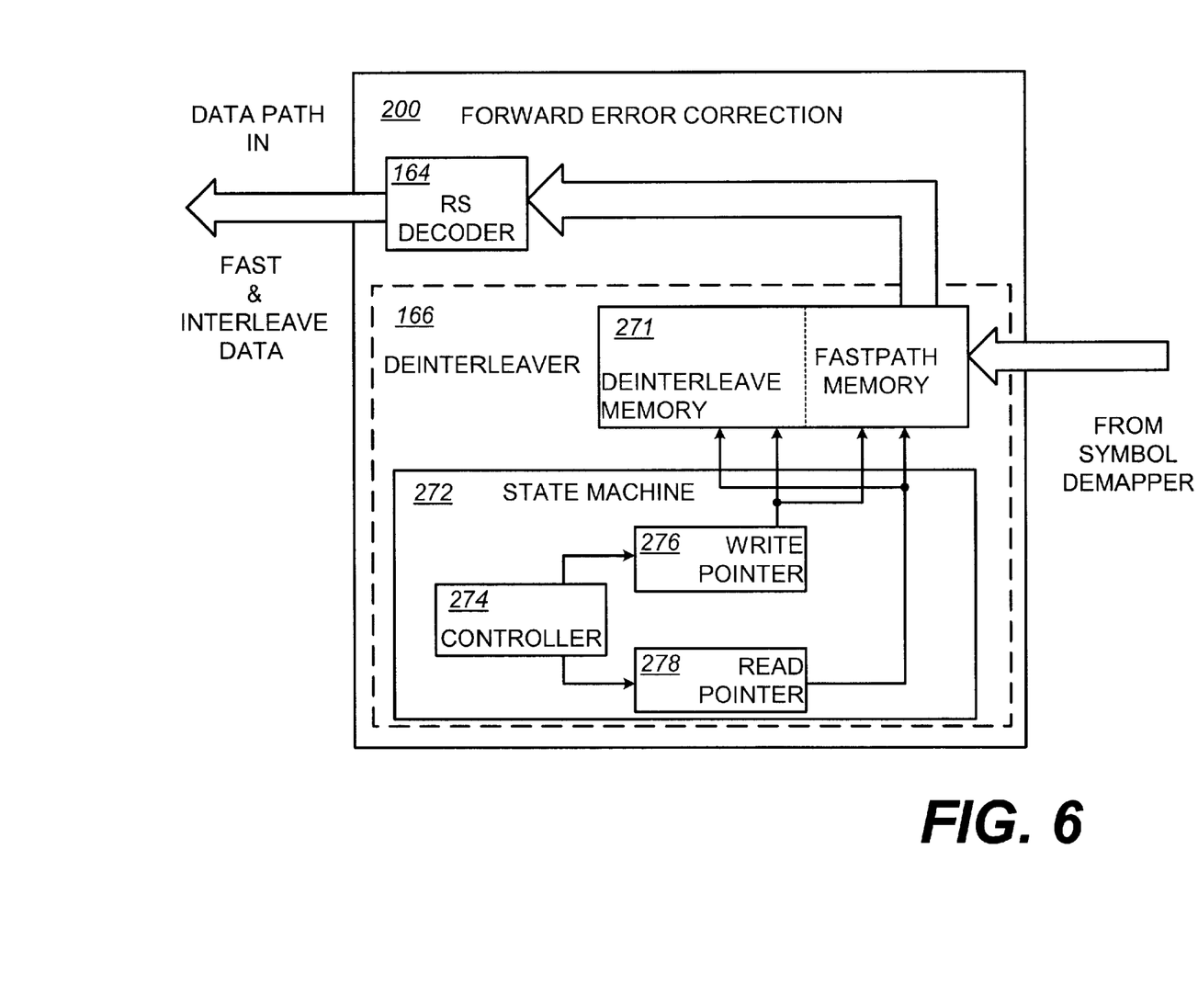
FIG. 6 is a block diagram illustrating the integrated deinterleaving memory in the receive data path FEC of the present invention.

Having briefly described the architecture of the improved FEC of the present invention in the transmit direction, reference is now directed to FIG. 6, which illustrates a functional block diagram featuring modem architecture in the receive data path. In this regard, the improved FEC 200 may comprise a single Reed-Solomon decoder 164 and a deinterleaver 166. The deinterleaver 166 may further comprise a deinterleave memory 271 and a state machine 272. The deinterleave memory 271 may be divided into a portion for interleaved data storage and a portion for fastpath data storage as illustrated in FIG. 6. The deinterleave memory may be implemented via on chip RAM as well as with external RAM devices as are well known by those skilled in the art. The state machine 272 may further comprise a controller 274, a write pointer 276, and a read pointer 278.

In this regard, the controller 274 coordinates the write pointer 276 to ensure that data being placed in interleave memory 271 by a symbol demapper (not shown) is placed in a memory location where it can later be retrieved in the correct sequence for further digital processing. Similarly, the controller 274 coordinates the write pointer 276 to ensure that fastpath data being stored in interleave memory 271 by the symbol demapper (not shown) is placed in memory locations where they can later be retrieved in the proper sequence for further digital processing. It is readily apparent that if fastpath and interleave data are integrated or written to a single memory device using a forward operative process that the fastpath and interleave data may be reassembled or read in the correct order by a similar process configured to automatically recognize fastpath and interleaved data locations within the memory device.

Both fastpath data and interleave data having been previously demapped by a symbol demapper may be introduced at the deinterleave memory 271 for interim storage and deinterleaving. As each data symbol is processed, the output data may be sent to deinterleave memory 271. State machine 272 may be configured to control the positioning of a deinterleave write pointer and a deinterleave read pointer. By processing both the fast data path and interleave path data, the integrated deinterleaver 166 of the present invention provides input processing rate adaptability as data may be stored by interleave memory 271 once it has been processed by the symbol demapper. Similarly, since both the fastpath and interleaved data are available in the same memory device (deinterleave memory 271) the deinterleaver 166 is rate adaptable to the next stage of digital signal processing, illustrated in FIG. 6 as Reed-Solomon decoding. In this regard, Reed-Solomon decoder 164 may control the rate that data is read from the deinterleave memory 271.

Figure 7:
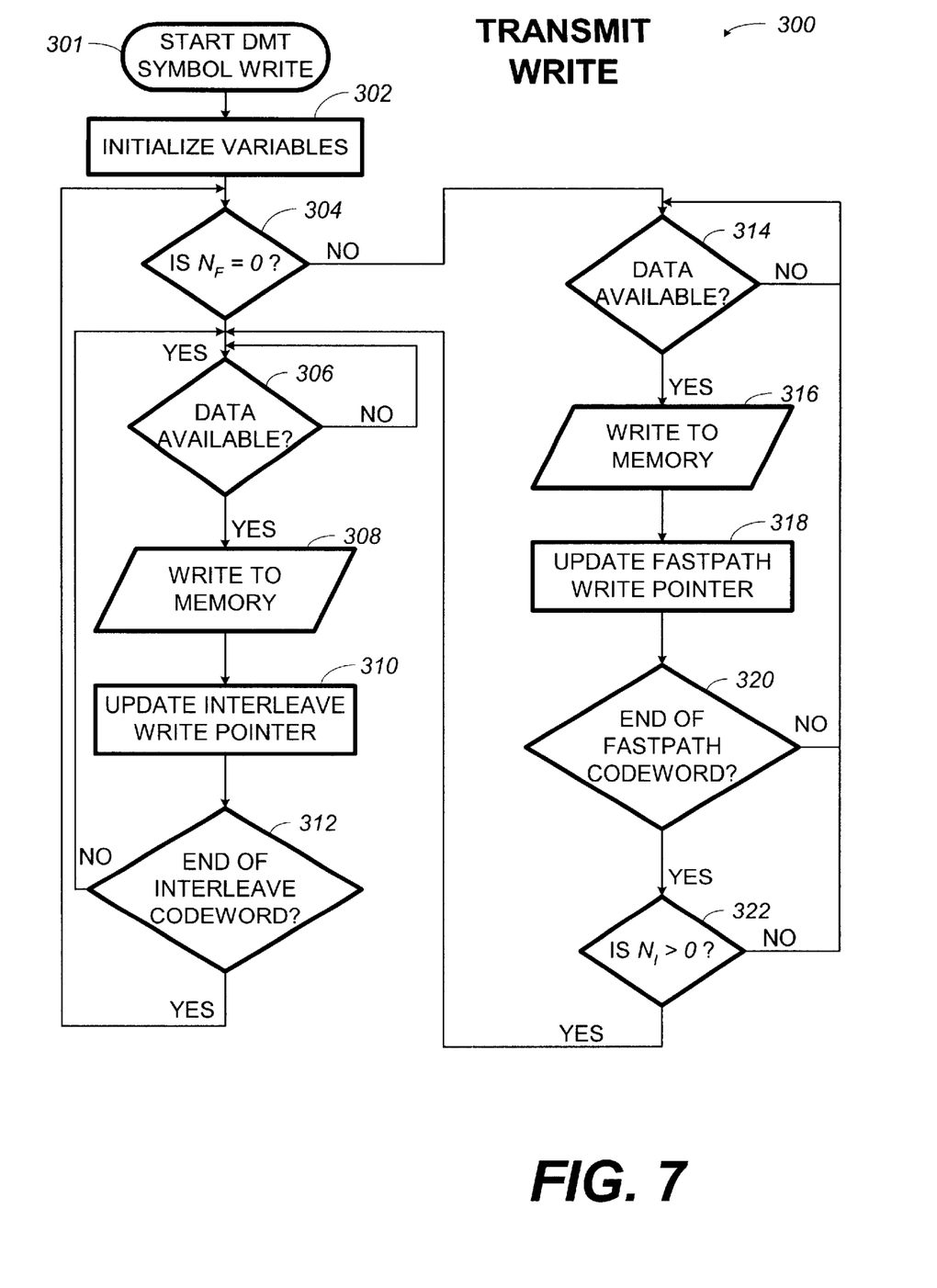
FIG. 7 is a flowchart illustrating operation of a transmit write algorithm consistent

Having briefly introduced the architecture of an improved deinterleaver in FIG. 6, reference is now directed to FIG. 7, which illustrates a flowchart of an algorithm for controlling the transmit write of fastpath and interleaved data into interleave memory 171 (see FIG. 5).

In this regard, the transmit write algorithm 300 may be implemented as illustrated in FIG. 7. The transmit write algorithm 300 begins with step 301, designated "start DMT symbol write." Next, in step 302, the algorithm initializes variables $N_F$, the number of fastpath bytes in a codeword, and $N_1$, the number of interleaved bytes in a codeword. The algorithm proceeds to step 304 where it is determined if $N_F=0$ (fastpath data not encountered). If yes, and data is available as determined in step 306, one byte of interleaved data is written to memory in step 308. If yes, and data is not available, the algorithm simply returns to step 306 to check for the availability of Reed-Solomon encoded data. The algorithm proceeds to step 310, where the interleave write pointer is updated. Next, in step 312, a determination is performed to check if the entire interleave codeword has been written to memory. If no, steps 306 through 312 are performed until the entire interleaved codeword has been written to interleave memory 171.

If fastpath data was encountered in step 304 ($N_F$ not equal to 0) processing continues with step 314, where a determination is performed to confirm that data is available. If no, the algorithm simply returns to step 314 to check for the availability of Reed-Solomon encoded data. Next, in step 316, fastpath data is written to that portion of interleave memory 171 designated for fastapath data. Next, in step 318, the algorithm updates the fastpath write pointer. Having updated the fastpath write pointer, the algorithm proceeds to check if the entire fastpath codeword has been written to memory in step 320. If the determination in step 320 is no, steps 314 through 320 are repeated until the entire fastpath codeword is processed. After the entire fastpath codeword has been successfully written to memory, a check is performed in step 322 if interleaved data is present. If no, the next fastpath codeword is written to memory as previously described. If it is determined in step 322 that interleaved data is present, processing returns to step 306 as previously described.

Figure 8:
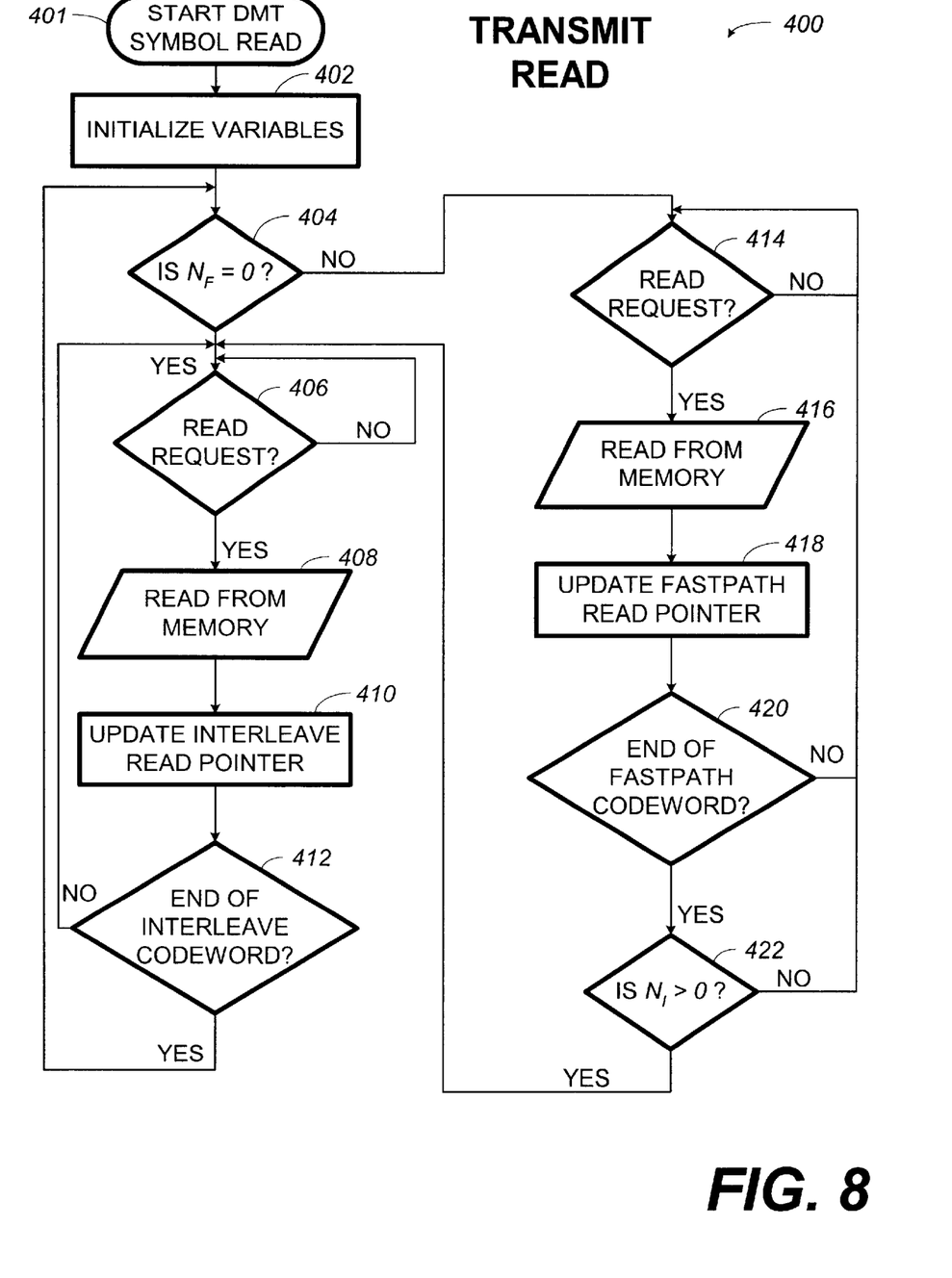
FIG. 8 is a flowchart illustrating operation of a transmit read algorithm consistent with the present invention.

Having described the transmit write algorithm 300 as illustrated in FIG. 7, reference is now directed to FIG. 8. In this regard, FIG. 8 illustrates a flowchart of an algorithm for controlling the transmit read of fastpath and interleaved data read from interleave memory 171 (see FIG. 5).

In this regard, the transmit read algorithm 400 may be implemented as illustrated in FIG. 8. The transmit read algorithm 400 begins with step 401, designated "start DMT symbol read." Next, in step 402, the algorithm initializes variables NF, the number of fastpath bytes in a codeword, and $N_1$ the number of interleaved bytes in a codeword. The algorithm proceeds to step 404 where it is determined if $N_F=0$ (fastpath data not encountered). If yes, and a read request is encountered as determined in step 406, one byte of interleaved data is read from memory in step 408. If yes, and a read request is not encountered, the algorithm simply returns to step 406 to check for the read request from the tone generator and constellation encoder. Next, in step 410, the interleave read pointer is updated. Next, in step 412 a check is performed to see if the entire interleave codeword has been processed. If no, steps 406 through 412 are performed until the entire interleaved codeword has been read from interleave memory 171.

If fastpath data was encountered in step 404 ($N_F$ not equal to 0) processing continues with step 414, where a determination is performed to confirm that a read request is pending. If no, the algorithm simply returns to step 414 to wait for the next read request by the tone generator and constellation encoder. Next, in step 416, fastpath data is read from interleave memory 171. Next, in step 418, the algorithm updates the fastpath read pointer. Having updated the fastpath read pointer, the algorithm proceeds to check if the entire fastpath codeword has been written to memory in step 420. If the determination in step 420 is no, steps 414 through 420 are repeated until the entire fastpath codeword is processed. After the entire fastpath codeword has been successfully read from memory, a check is performed in step 422 if interleaved data is present. If no, the next fastpath codeword is written to memory as previously described. If it is determined in step 422 that interleaved data is present, processing returns to step 406 as previously described.

Figure 9:
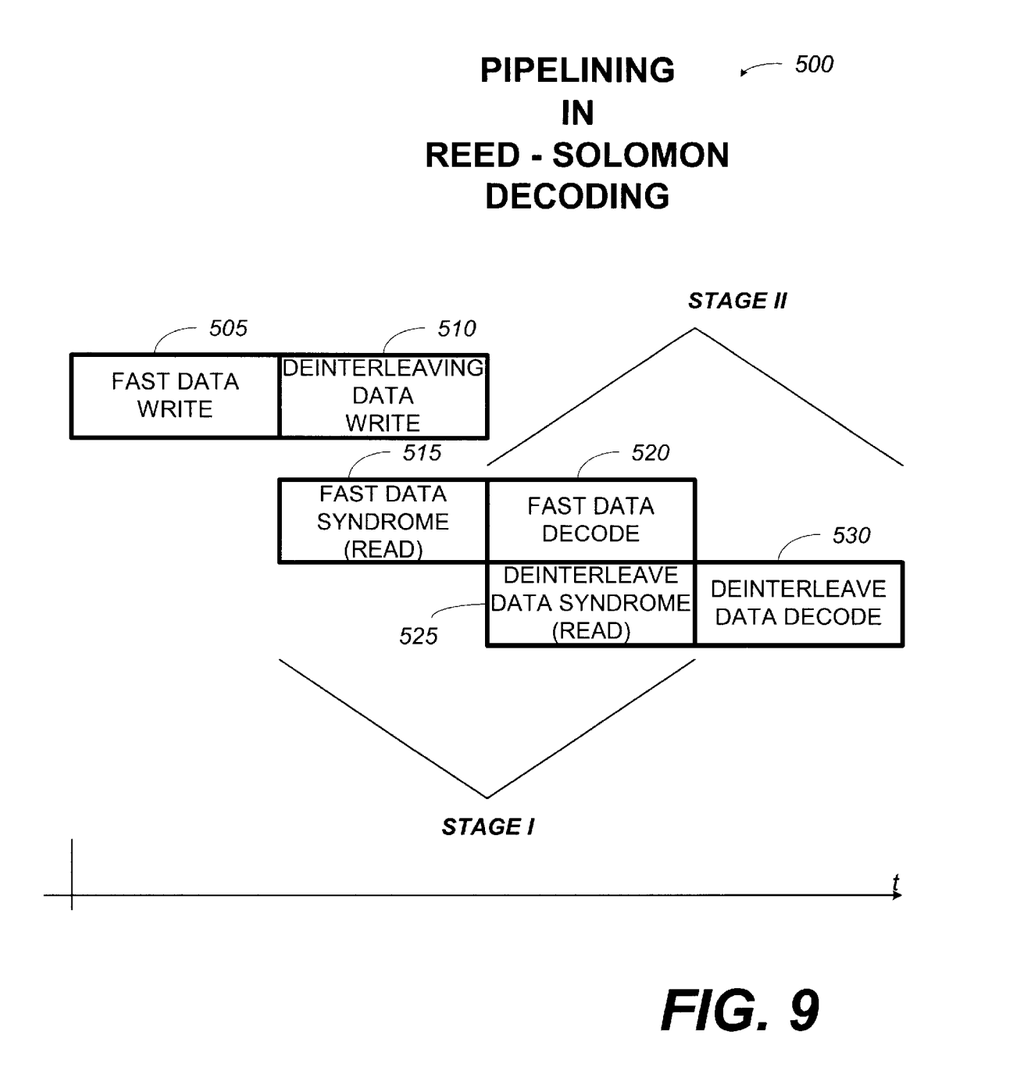
FIG. 9 is a timeline illustrating portions of the Reed-Solomon Decoding process that may be pipelined.

Having described the transmit read algorithm 400 as illustrated in FIG. 8, reference is now directed to FIG. 9. In this regard, FIG. 9 illustrates pipelining in Reed-Solomon Decoding. More specifically, FIG. 9 presents a timing diagram indicating which processing stages may be processed concurrently with the improved integrated FEC of the present invention.

In this regard, timing diagram 500 illustrates Reed-Solomon Decoding stages as follows. First, Reed-Solomon decoding may be divided into two stages, Stage I and Stage II as shown. Stage I may comprise a fast data write operation 505 and a deinterleave data write operation 510 as illustrated in FIG. 9. Stage II may comprise a fast data syndrome (read) 515 and a fast data decode operation 520. Stage II may further comprise a deinterleave data syndrome (read) operation 525 and a deinterleave data decode operation 530 as further illustrated on the timeline of FIG. 9. It is significant to note that the timeline of FIG. 9 indicates that the deinterleaving data write 510 of Stage I may be performed concurrently with the fast data syndrome (read) 515 of Stage II. Similarly, the fast data decode calculation 520 of Stage II may be performed concurrently with the deinterleave data syndrome (read) operation of Stage II. As clearly shown in FIG. 9, by simultaneously performing four of the six stages of Reed-Solomon decoding in a pipelined fashion, the overall processing time associated with Reed-Solomon decoding may be reduced.

Figure 10:
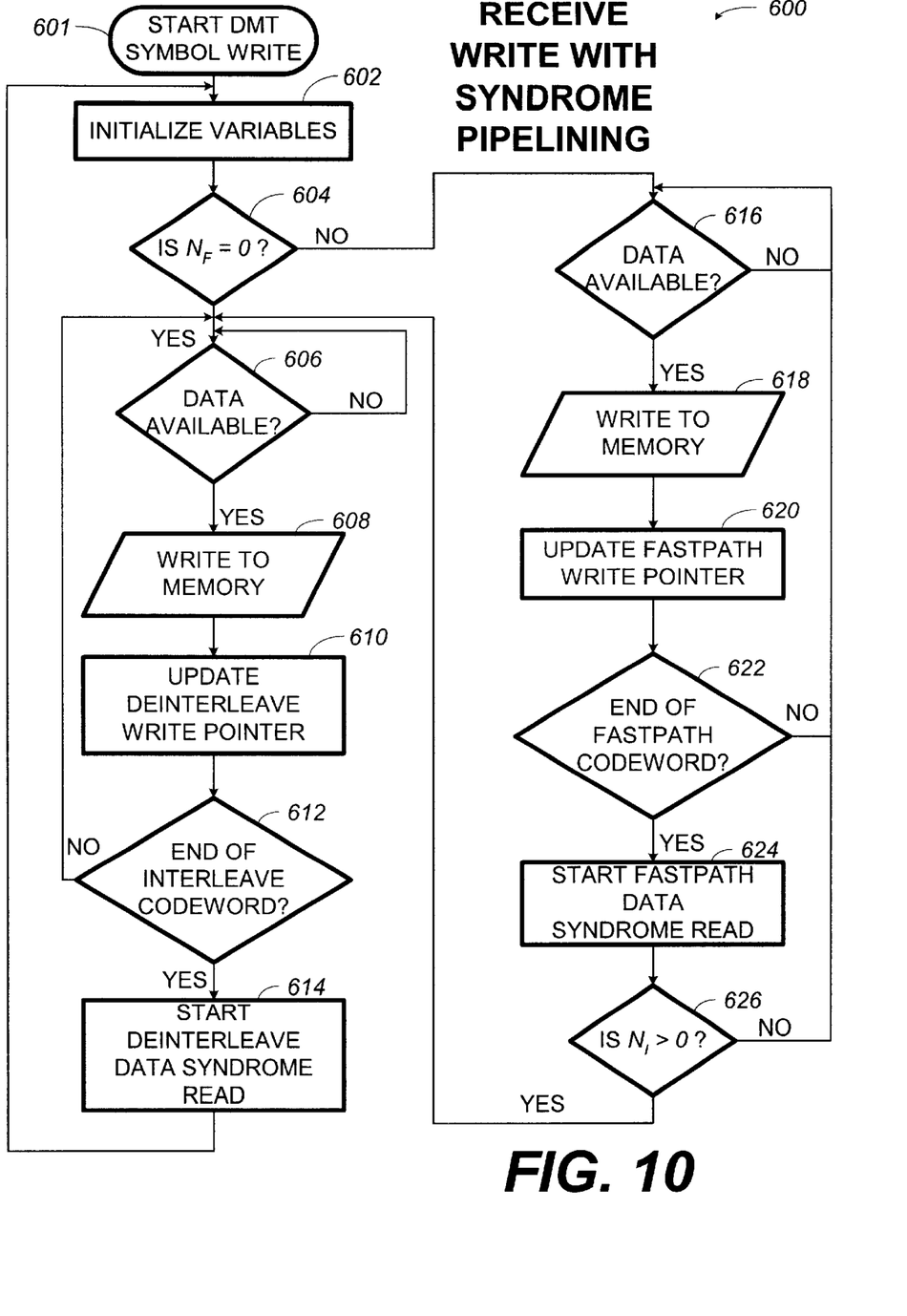
FIG. 10 is a flowchart illustrating operation of a receive write algorithm with syndrome calculation pipelining.

Having briefly described pipelining in Reed-Solomon decoding with regard to FIG. 9, reference is now directed to FIG. 10. In this regard, FIG. 10 is a flowchart of an algorithm for controlling the receive write with syndrome pipelining as previously introduced in association with FIG. 9.

The receive write and syndrome pipelining algorithm 600 of FIG. 10, begins with step 601, designated, "start DMT symbol write." The algorithm proceeds by initializing variables $N_F$, the number of fastpath bytes in a codeword, $N_1$, the number of interleaved bytes in a codeword, and $N_{Tx}$, the number of bytes for transmission. $N_{Tx}$, the number of bytes for transmission, may be determined by dividing the number of bytes per codeword by the number of bytes per codeword to arrive at the number of bytes per symbol. The receive write and syndrome pipelining algorithm 600 of FIG. 10 represents the case where there one symbol per codeword is transmitted.

The algorithm proceeds to step 604 where it is determined if $N_F=0$ (fastpath data not encountered). If yes, and data is available as determined in step 606, one byte of interleaved data is written to memory in step 608. If yes, and a read request is not encountered, the algorithm simply returns to step 606 to check for available data from the demapper. Next, in step 610, the deinterleave write pointer is updated. In step 612, a check is performed to see if the entire interleave codeword has been processed. If no, steps 606 through 612 are performed until the entire interleaved codeword has been written to deinterleave memory 271. If the determination in step 612 is affirmative, the algorithm proceeds to step 614 start deinterleave data syndrome read.

If fastpath data was encountered in step 604 ($N_F$ not equal to 0) processing continues with step 616, where a determination is performed to confirm that data is available from the demapper. If no, the algorithm simply returns to step 616 to wait for data output from the demapper. Next, in step 618, fastpath data is written to deinterleave memory 271. In step 620, the algorithm updates the fastpath write pointer. Having updated the fastpath write pointer, the algorithm proceeds to check if the entire fastpath codeword has been written to memory in step 622. If the determination in step 622 is no, steps 616 through 622 are repeated until the entire fastpath codeword is processed. After the entire fastpath codeword has been successfully written to memory, the algorithm starts the fastpath data syndrome read in step 624. Having started the fastpath data syndrome read in step 624, the algorithm proceeds to perform a check in step 626 if interleaved data is present. If no, the next fastpath codeword is written to memory and the next fastpath data syndrome read is started as previously described in association with steps 616 through 624. If it is determined in step 626 that interleaved data is present, processing returns to step 606 as previously described.

Figure 11:
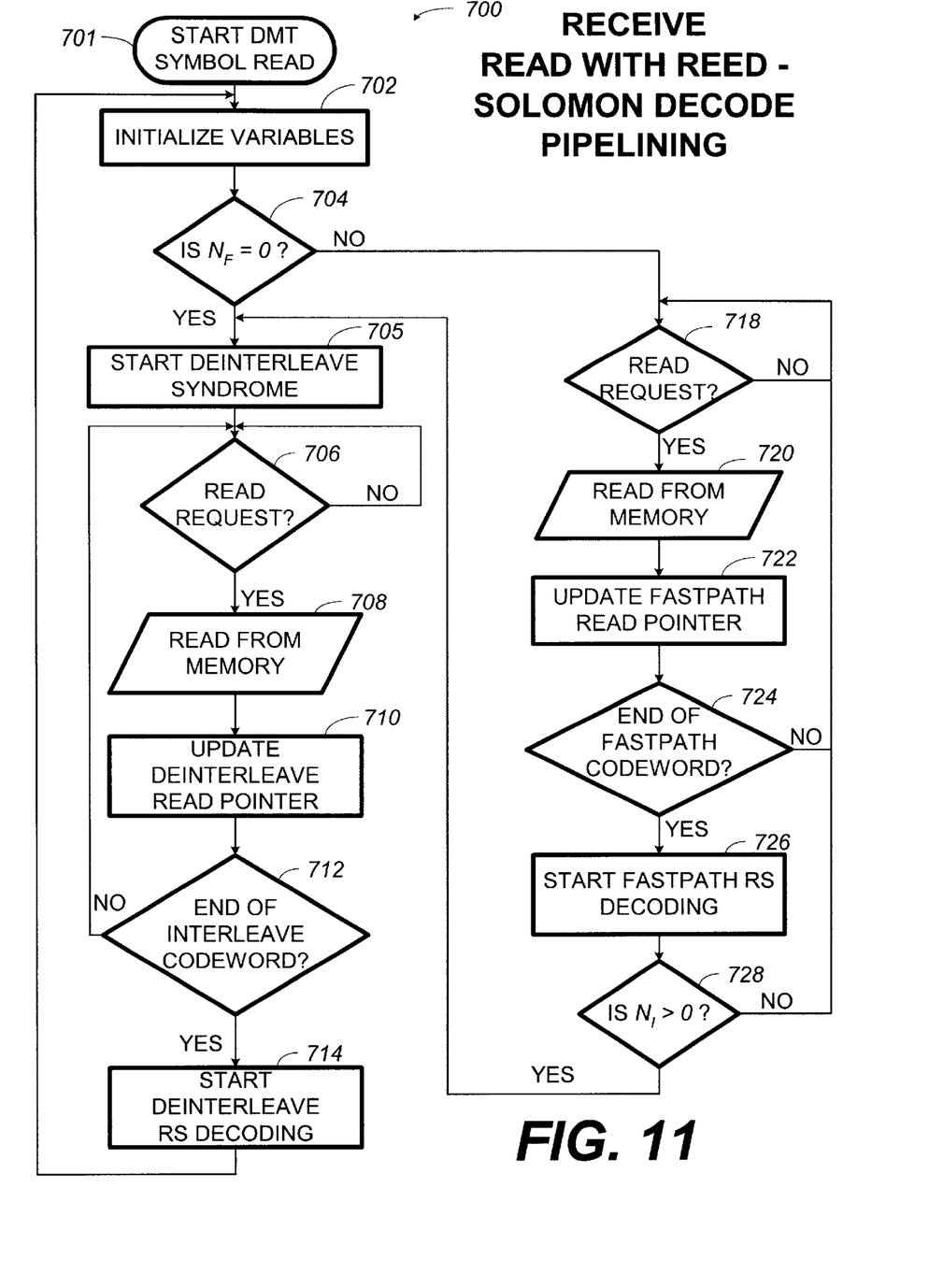
FIG. 11 is a flowchart illustrating operation of a receive read algorithm with Reed-Solomon decode pipelining.

Having described the receive write algorithm with syndrome pipelining 600 as illustrated in FIG. 10, reference is now directed to FIG. 11. In this regard, FIG. 11 illustrates a flowchart illustrating an algorithm for controlling a receive read with Reed-Solomon decoding.

The receive read with Reed-Solomon decode pipelining algorithm 700 of FIG. 11, begins with step 701, designated, "start DMT symbol read." The algorithm proceeds by initializing variables $N_F$, the number of fastpath bytes in a codeword, $N_1$, the number of interleaved bytes in a codeword, and $N_{Tx}$, the number of bytes for transmission. $N_{Tx}$, the number of bytes for transmission, may be determined by dividing the number of bytes per codeword by the number of symbols per codeword to arrive at the number of bytes per symbol. The receive read with Reed Solomon decode pipelining algorithm 700 of FIG. 11 represents the case where there one symbol per codeword is transmitted.

The algorithm proceeds to step 704 where it is determined if $N_F=0$ (fastpath data not encountered). If yes, a deinterleave data syndrome read is started in step 705. If a data read request is pending, as determined in step 706, one byte of interleaved data is read from memory in step 708. If a read request is detected, the algorithm simply returns to step 706 to check for available data from the demapper. Next, in step 710, the deinterleave read pointer is updated. In step 712, a check is performed to see if the entire interleave codeword has been processed. If no, steps 706 through 712 are performed until the entire interleaved codeword has been read from deinterleave memory 271.

If fastpath data was encountered in step 704 ($N_F$ not equal to 0) processing continues with step 718, where a check is performed to determine if a data read request is pending from the Reed-Solomon decoder 164. If no, the algorithm simply returns to step 718 to wait for the read request from the Reed-Solomon decoder 164. Next, in step 720, fastpath data is read from deinterleave memory 271. In step 722, the algorithm updates the fastpath read pointer. Having updated the fastpath read pointer, the algorithm proceeds to check if the entire fastpath codeword has been read from memory in step 724. If the determination in step 724 is no, steps 718 through 724 are repeated until the entire fastpath codeword is read from memory. After the entire fastpath codeword has been successfully read from memory, the algorithm starts the fastpath data Reed-Solomon decoding as illustrated in step 726. Having started the Reed-Solomon decoding in step 726, the algorithm proceeds to perform a check in step 728 if interleaved data is present. If no, the next fastpath codeword is read from memory and the next fastpath Reed-Solomon decoding operation is started as previously described in association with steps 718 through 726. If it is determined in step 726 that interleaved data is present, processing returns to step 705 as previously described.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A resource optimized digital subscriber line modem comprising:

an encoder configured to receive an input data stream having data signals for both a fastpath signal processing and an interleave signal processing, the encoder configured to encode the input data stream to generate an encoded serial data stream;

an interleaver configured to receive the encoded serial data stream, the interleaver further configured to a first portion of the encoded serial data stream adapted to fastpath signal processing to a fastpath memory and to forward a second portion of the encoded serial stream adapted for interleaving to an interleave memory, the interleaver configured to shuffle a number of bytes of the second portion of the encoded serial data stream in response to a number of encoder parameters, the interleaver configured to decouple memory write operations from memory read operations.

2. The digital subscriber line modem of claim 1, wherein the encoder is a Reed-Solomon encoder.

3. The digital subscriber line modem of claim 1, wherein the interleaver comprises:

at least one memory device, and a state machine, the state machine configured to set a fastpath memory write pointer and a fastpath memory read pointer in response to a fastpath base address, the state machine configured to increment the fastpath memory write pointer as subsequent fastpath data bytes are processed by the encoder, the state machine further configured to increment the fastpath memory read pointer in response to a fastpath data read request from a data processor, the state machine configured to set an interleave memory write pointer and an interleave memory read pointer in response to an interleave base address, the state machine configured to increment the interleave memory write pointer in response to system interleave parameters as subsequent interleave data bytes are processed by the encoder, the state machine further configured to increment the interleave memory read pointer in response to the system interleave parameters as subsequent interleave data read requests are received from a data processor.

4. The digital subscriber line modem of claim 3, wherein the at least one memory device comprises a single on chip random access memory (RAM) device.

5. The digital subscriber line modem of claim 3, wherein the at least one memory device comprises a single memory device with an interleave memory portion and a fastpath memory portion.

6. The digital subscriber line modem of claim 3, wherein the at least one memory device comprises a first memory device configured to store encoded fastpath data and a second memory device configured to store encoded interleave data.

7. A digital subscriber line modem comprising:

a deinterleaver configured to receive an encoded serial stream of encoded data from a data processor, the encoded data stream comprising both fastpath and interleave data signals, the deinterleaver further configured to write encoded data signals appropriate for fastpath processing to fastpath memory when the fastpath data is provided by the data processor and to write encoded data signals appropriate for deinterleaving to deinterleave memory when the interleave data is provided by the data processor, the deinterleaver configured to reassemble the bytes of the interleave data signal upon a read request for interleave data, the deinterleaver configured to read fastpath data upon a read request for fastpath data, the deinterleaver configured such that memory write operations are decoupled from memory read operations; and a decoder configured to request both fastpath and interleave data from the deinterleaver, the decoder configured to decode both the fastpath and the interleave data to generate a decoded serial stream of output data.

8. The digital subscriber line modem of claim 7, wherein the decoder is a Reed-Solomon decoder.

9. The digital subscriber line modem of claim 7, wherein the deinterleaver comprises:

at least one memory device, and a state machine, the state machine configured to set a fastpath memory write pointer and a fastpath memory read pointer in response to a fastpath base address, the state machine configured to increment the fastpath memory write pointer as subsequent fastpath data bytes are processed by the data processor, the state machine further configured to increment the fastpath memory read pointer in response to a fastpath data read request from the decoder, the state machine configured to set an interleave memory write pointer and an interleave memory read pointer in response to an interleave base address, the state machine configured to increment the interleave memory write pointer in response to system interleave parameters as subsequent interleave data bytes are processed by the data processor, the state machine further configured to increment the interleave memory read pointer in response to system interleave parameters as subsequent interleave data read requests are received from the decoder.

10. The digital subscriber line modem of claim 9, wherein the at least one memory device comprises a single on chip random access memory (RAM) device.

11. The digital subscriber line modem of claim 9, wherein the at least one memory device comprises a single memory device with a deinterleave memory portion and a fastpath memory portion.

12. A method for forward error correction in a digital subscriber line modem comprising:

identifying data services suitable for fastpath (a low-latency) signal transmission;

identifying data services suitable for interleaving (a higher-latency) signal transmission;

encoding all data service signals in an encoder to generate an encoded data stream wherein individual codewords comprise both fastpath and interleaved data;

using a state machine and a fastpath memory to write fastpath encoded data in a fastpath memory;

using a state machine, an interleave memory, and system encoding parameters to write encoded data associated with higher-latency data services in the interleaved memory wherein individual bytes of the higher-latency data codeword are distributed in time;

using a state machine and a fastpath memory to read fastpath encoded data from the fastpath memory in response to read requests; and using a state machine, an interleave memory, and system encoding parameters to read encoded data associated with higher-latency data services from the interleaved memory in response to read requests.

13. The method of claim 12, wherein the step of using a state machine and a fastpath memory to write fastpath encoded data is performed as fastpath data bytes are provided by the encoder and wherein the step of using a state machine, an interleave memory, and system encoding parameters to write interleave encoded data is performed as interleave data bytes are provided by the encoder.

14. The method of claim 12, wherein the step of using a state machine and a fastpath memory to read fastpath encoded data is performed as fastpath data bytes are requested from a data processor and the step of using a state machine, an interleave memory, and system encoding parameters to read interleave encoded data is performed as interleave data bytes are requested from a data processor.

15. A method for forward error correction in a digital subscriber line modem comprising:

receiving an encoded digital data signal comprising both a fastpath (a low-latency) signal transmission and an interleaved (a higher-latency) signal transmission;

processing both the fastpath signal transmission and the interleaved signal transmission through one encoder to generate an encoded data stream;

using a state machine and a fastpath memory to write fastpath encoded data in a fastpath memory;

using a state machine, an interleave memory, and system encoding parameters to write an encoded interleaved data signal in an interleaved memory;

using a state machine and a fastpath memory to read fastpath encoded data from the fastpath memory in response to read requests;

using a state machine, an interleave memory, and system encoding parameters to read interleaved encoded data from the interleaved memory in response to read requests; and decoding both the fastpath signal transmission and the interleaved signal transmission in one decoder to restore a digital signal stream comprising a plurality of received data service signals.

16. The method of claim 15, wherein the step of using a state machine and a fastpath memory to write fastpath encoded data is performed as fastpath data bytes are provided by a demapper and wherein the step of using a state machine, an interleave memory, and system encoding parameters to write interleave encoded data is performed as interleave data bytes are provided by the demapper.

17. The method of claim 15, wherein the step of using a state machine and a fastpath memory to read fastpath encoded data is performed as fastpath data bytes are requested from a decoder and wherein the step of using a state machine, an interleave memory, and system encoding parameters to read interleave encoded data is performed as interleave data bytes are requested from the decoder.

18. A digital subscriber line modem comprising:

means for encoding a plurality of digital data signals to generate an encoded digital data stream comprising codewords derived from both low-latency digital data (fastpath) and higher-latency digital data (interleave data);

means for writing low-latency digital data codeword bytes into memory;

means for writing higher-latency digital data codeword bytes into memory;

means for reading low-latency digital data coedeword bytes from memory;

means for reading higher-latency digital data codeword bytes from memory; and means for controlling the reading steps such that an encoded digital data composite codeword is generated.

19. The digital subscriber line modem of claim 18, wherein the means for encoding the plurality of digital data signals is accomplished with a Reed-Solomon encoder.

20. The digital subscriber line modem of claim 18, wherein the means for writing and reading low-latency and higher-latency digital data codeword bytes is accomplished with a state machine and at least one random access memory device.

21. The digital subscriber line modem of claim 20, wherein the means for writing both the low-latency and higher-latency digital data is responsive to said encoding means.

22. The digital subscriber line modem of claim 20, wherein the means for reading both the low-latency and higher-latency digital data is responsive to read requests from a data processor.

23. The digital subscriber line modem of claim 22, wherein the data processor is configured to perform tone ordering and constellation encoding.

24. A digital subscriber line (DSL) modem comprising:

means for receiving an encoded digital data signal comprising a plurality of codewords derived from both low-latency digital data (fastpath) and higher-latency digital data (interleave data);

means for writing low-latency digital data codeword bytes into memory;

means for writing higher-latency digital data codeword bytes into memory;

means for reading low-latency digital data coedeword bytes from memory;

means for reading higher-latency digital data codeword bytes from memory; and means for controlling the reading steps such that the received encoded digital data signal is deinterleaved to generate a composite encoded digital data codeword in the order it was originally transmitted from a similarly configured remote DSL modem.

25. The digital subscriber line modem of claim 24, further comprising:

means for decoding the composite encoded digital data codeword.

26. The digital subscriber line modem of claim 25, wherein the means for reading both the low-latency and higher-latency digital data is responsive to read requests from said means for demapping.

27. The digital subscriber line modem of claim 25, wherein the means for decoding the plurality of encoded codewords is accomplished with a Reed-Solomon decoder.

28. The digital subscriber line modem of claim 24, wherein the means for writing and reading low-latency and higher-latency digital data codeword bytes is accomplished with a state machine and at least one random access memory device.

29. The digital subscriber line modem of claim 24, wherein the means for writing both the low-latency and higher-latency digital data is responsive to a demapper.

30. A method for pipelining data processing in a digital subscriber modem that uses Reed-Solomon encoding/decoding comprising:

segmenting a Reed-Solomon decoder into a first stage comprising syndrome calculation and a second stage comprising decoding;

performing a fastpath data write;

performing a deinterleave data write and a fastpath data syndrome read operation simultaneously;

performing a fastpath data decode operation and a deinterleave data syndrome read simultaneously; and performing a deinterleave data decode operation.

* * * * *